United States Patent
Hellmann et al.

(10) Patent No.: US 7,113,859 B2
(45) Date of Patent: Sep. 26, 2006

(54) INPUT DEVICE FOR SPEED REGULATING SYSTEM ON MOTOR VEHICLES

(75) Inventors: Manfred Hellmann, Hardthof (DE); Hermann Winner, Bietigheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/506,055

(22) PCT Filed: Sep. 30, 2002

(86) PCT No.: PCT/DE02/03704

§ 371 (c)(1),
(2), (4) Date: Jan. 5, 2005

(87) PCT Pub. No.: WO03/074344

PCT Pub. Date: Sep. 12, 2003

(65) Prior Publication Data

US 2005/0114009 A1    May 26, 2005

(30) Foreign Application Priority Data

Mar. 1, 2002    (DE)    ................. 102 09 137

(51) Int. Cl.
B60T 8/32    (2006.01)

(52) U.S. Cl. ......................................... 701/93

(58) Field of Classification Search ................... 701/93
See application file for complete search history.

(56) References Cited

U.S. PATENT DOCUMENTS 6,405,820 B1 *    6/2002    Prestl    ................. 180/167

FOREIGN PATENT DOCUMENTS

| DE | 198 02 704 | 8/1999 |
| EP | 0 876 936 | 11/1998 |
| WO | WO-0187661 | * 11/2001 |

OTHER PUBLICATIONS

Winner, et al., *Adaptive Cruise Control System—Aspects and Development Trends*, SAE Technical Paper Series 961010, International Congress & Exposition, Detroit, Feb. 26-29, 1996.**

* cited by examiner

Primary Examiner—Thu V. Nguyen
(74) Attorney, Agent, or Firm—Kenyon & Kenyon LLP

(57) ABSTRACT

Input device for a cruise control system in motor vehicles, having an accelerator pedal, a switch for input of a desired speed and a determination device which increases the desired speed as a function of the duration of operation of the switch, wherein the determination device changes the function which determines the increase in the desired speed as a function of the operation of the accelerator pedal.

5 Claims, 2 Drawing Sheets

INPUT DEVICE FOR SPEED REGULATING SYSTEM ON MOTOR VEHICLES

FIELD OF THE INVENTION

The present invention relates to an input device for a cruise control system in motor vehicles, having an acceleration control device, a switch for input of a desired speed, and a determination device which increases the desired speed as a function of the time of actuation of the switch.

BACKGROUND INFORMATION

Cruise control systems are known for motor vehicles for regulating the speed of the vehicle at a desired speed selected by the driver. If the vehicle also has a distance sensor, e.g., in the form of a radar sensor, a stereo camera system or the like, the vehicle speed may also be regulated in such a way that a suitable safety distance from a vehicle traveling in front is automatically maintained. One example of such a regulating system, which is also known as an ACC system (active cruise control), is described in "Adaptive Cruise Control System—Aspects and Development Trends" by Winner, Witte, Uhler and Lichtenberg, Robert Bosch GmbH, in SAE Technical Paper Series 961010, International Congress & Exposition, Detroit, Feb. 26–29, 1996.

The switch with which the driver is able to change the desired speed is usually formed by a lever on the steering wheel, which is movable either up or down to increase or reduce the desired speed. If this lever is kept in the upper end position for a long period of time, the determination device causes an incremental increase in the desired speed with fixed increments and at fixed intervals. Accordingly, the desired speed is reduced when the driver keeps the lever in the lower position. When the driver releases the lever, the set desired speed is maintained.

With the help of the accelerator pedal or, more generally, with the help of an acceleration control device, the driver may also intervene directly in the driving system of the vehicle and thus override the function of the cruise control system at any time. Thus, for example, the driver may depress the accelerator pedal to temporarily exceed the set desired speed so as to pass another vehicle. When the driver releases the accelerator pedal again, the speed of the vehicle drops back to the previously set desired speed. However, when the driver has accelerated the vehicle with the help of the accelerator pedal, the driver may briefly tip the lever up or down so that the vehicle speed which has then been reached will be stored as the new desired speed. In this sense, the acceleration control device, i.e., the accelerator pedal is also to be regarded as part of the input device.

German Published Patent Application No. 198 02 704 describes an input device using which the desired speed may be varied only incrementally, e.g., in 10 km/h increments. If the driver operates the switch while accelerating by using the accelerator pedal, the value closest to the actual speed then reached is stored as the new desired speed.

In general the driver thus has two possibilities of increasing the desired speed. First, the driver may accelerate the vehicle with the help of the accelerator pedal and then set the new desired speed by touching the switch. Second, the driver may hold the lever in the top position to cause the determination device to increase the desired speed at a fixedly predetermined rate of increase.

The advantage of the first variant is that the driver himself is able to determine by the pressure on the accelerator pedal at what rate the vehicle is accelerated, so that the driver is able to reach the new desired speed relatively rapidly by a high rate of acceleration of the vehicle. However, one disadvantage is that the new desired speed may not be set until the vehicle has reached that speed. Since the regulating system operates with an unavoidable control lag, this may result in temporary overshooting of the actual desired speed.

This overshooting of the regulating system may be largely avoided with the second variant. Another advantage of this variant is that the change in the throttle valve setting and/or the injection quantity using which the acceleration of the vehicle is induced is not determined directly by the driver in this case but instead is calculated by the engine management system of the vehicle and therefore may be optimally adapted to the particular operating state of the engine, so that acceleration is accomplished with optimum efficiency and therefore with favorable fuel consumption. One disadvantage of the second variant, however, is that the driver must hold the lever in the upper position until the setting ultimately desired has been reached by incrementally increasing the desired speed. This is perceived in a negative sense in terms of comfort and may also result in negative effects on driving safety, in particular when negotiating turns at a high speed. Even if the lever is located near the steering wheel, the driver will be unable to grip the steering wheel firmly with two hands as long as he is operating the lever, so this has a negative effect on control over the steering.

The time required for setting the higher desired speed depends on the increments and intervals by which the speed is increased as the desired speed is being implemented by the determination device. When the increments are larger, the new desired speed may be achieved rapidly, but with a relatively low precision. Conversely, if the desired speed is increased in shorter intervals, setting the speed is more difficult because of the very critical dependence of the desired speed on the duration of operation of the lever. When there is a rapid increase in the desired speed, the actual speed also remains temporarily behind the desired speed, so the driver may inadvertently set a desired speed that is too high and then have to correct the desired speed subsequently by adjusting it back in the opposite direction.

SUMMARY OF THE INVENTION

An object of the present invention is to create an input device which will allow the driver to have an accurate control of the desired speed while also permitting a simple and rapid increase in desired speed.

This object is achieved according to the present invention by the fact that the determination device varies the function which determines the increase in the desired speed as a function of the operation of the acceleration control device.

When the driver operates the switch without operating the accelerator pedal at the same time, the desired speed is increased only gradually according to a first function, so that precision tuning of the desired speed is possible for the driver. However, if the driver overrides the regulating function by using the accelerator pedal while at the same time operating the switch to increase the desired speed, the desired speed is then increased according to a second function at a higher rate of increase, so the new desired speed is reached very rapidly and the driver need not hold the switch for a long time.

This embodiment of the input device offers the driver maximum operating convenience in different driving situations. For example, if the cruise control system is not combined with a distance regulating system, there is often the need to adjust the desired speed to the speed of the vehicle traveling in front with a relatively precise control. In this case the driver is able to adjust the desired speed with precision merely with the help of the switch without using the accelerator pedal. However, if the driver would like to drive at a much higher desired speed for a longer period of time, e.g., after leaving a reduced speed zone, the driver will then first operate the accelerator pedal to accelerate the vehicle quickly. At the same time, the driver may then very rapidly set the new desired speed by using the switch and he may then take his foot from the accelerator pedal again while the vehicle automatically accelerates further until reaching the desired speed.

This input device has also proven to be particularly advantageous, e.g., in the situation in which a vehicle traveling in front is being followed by a vehicle having an ACC system, but the driver of the vehicle having ACC then decides to pass the other vehicle because the driver of the vehicle in front is driving at a very irregular speed. In this case the driver of the vehicle having ACC will initiate the passing maneuver by depressing the accelerator pedal and will then at the same time simultaneously increase the desired speed to a level that ensures that the distance from the vehicle being passed will increase by briefly touching the switch. When the passing maneuver is concluded and the driver releases the accelerator pedal, the vehicle then drops back to the new slightly increased desired speed.

The input device is preferably combined with a display device which informs the driver of the particular valid desired speed. The desired speed may be displayed with the help of LEDs, for example, which are integrated into the tachometer of the vehicle. Alternatively, a numerical display of the desired speed is also conceivable.

The function which determines the increase in the desired speed when the driver also operates the accelerator pedal may be designed in such a way that the value range contains only "rounded" speed values, e.g., 50 km/h, 60 km/h, 70 km/h, etc. Thus, when the vehicle has passed a construction area, for example, where the speed limit was 60 km/h and then enters a zone where the speed limit is 100 km/h, the driver is able to increase the desired speed very rapidly to 100 km/h by using the switch, i.e., in only four increments, while at the same time initiating the acceleration phase by depressing the accelerator pedal. Once the new desired speed has been reached, the driver may adjust the desired speed in fine increments merely by operating the switch, e.g., in increments of 1 or 2 km/h, without operating the accelerator pedal at the same time.

The functions which determine the increase in the desired speed by the determination device may differ in both the size of the increments as well as the length of the intervals during which these increases take place. These functions may also be nonlinear functions which, for example, cause the desired speed to first increase at a low rate of increase when the switch is operated and then to increase with a higher rate of increase when the switch is operated for a longer period of time.

DETAILED DESCRIPTION

Figure 1:
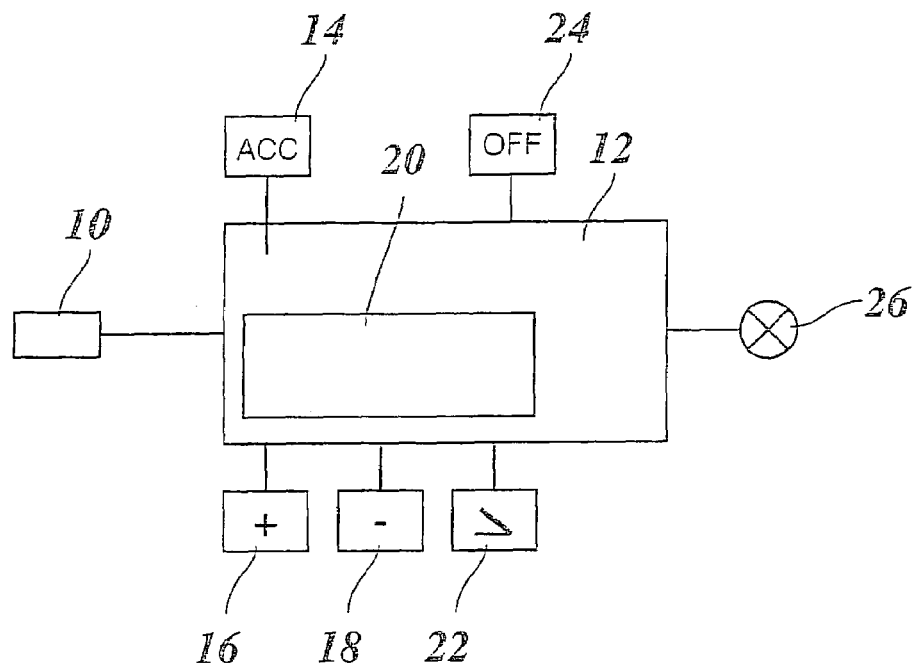
FIG. 1 shows a block diagram of a cruise control and the respective operating and display elements.

Since the design and operation of a cruise control having an ACC function are known, FIG. 1 shows only the most important components in a block diagram. A sensor device includes a distance sensor 10, e.g., a radar sensor, which measures the distance and relative speed of a vehicle traveling in front. If multiple target objects are detected by the radar sensor, e.g., multiple vehicles or stationary targets such as road signs and the like, the target object formed by the vehicle traveling directly in front of one's own is selected by plausibility analysis.

The signals of the distance sensor are analyzed in an electronic cruise control device 12 formed by a microcomputer, for example. Cruise control device 12 acts on the drive and brake systems of the vehicle to regulate the driving speed either at a desired speed selected by the driver or at a suitable distance from the vehicle traveling in front.

This cruise control function, referred to here as an ACC function, is activated by the driver by operating an ACC button 14. If a desired speed had already been stored previously, operation of the ACC button would have the function of causing the regulation at this desired speed to be resumed ("resume"). Otherwise the desired speed is set by the driver briefly operating a switch 16 (touch button switch) after the vehicle has reached the desired speed. Additional or persistent operation of switch 16 causes an incremental increase in the desired speed. Similarly, operation of a switch 18 causes an incremental reduction in the desired speed. Switches 16, 18 are formed in practice by a lever which is located on the steering wheel and is movable up to increase the desired speed or down to reduce the desired speed. The portion of cruise control 12 that determines the desired speed as a function of the commands input via switches 16, 18 is referred to as determination device 20.

By operating the accelerator pedal, the driver may override the ACC function to accelerate to a higher speed temporarily. Operation of the accelerator pedal is detected by an accelerator pedal sensor 22.

The cruise control may be deactivated by a touch button switch 24. A display lamp 26 indicates whether the ACC function is active or inactive.

Figure 2:
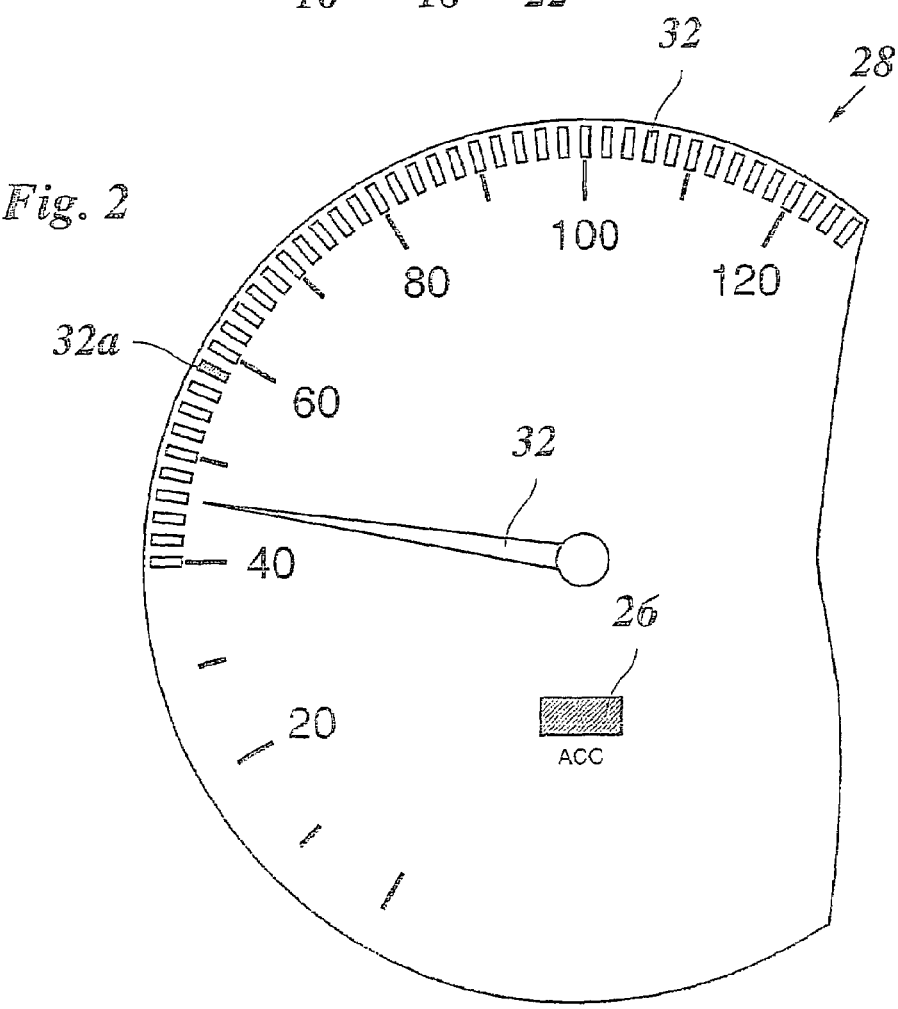
FIG. 2 shows a display device which is integrated into a speedometer on the dashboard of the vehicle.

FIG. 2 shows a speedometer 28 such as that usually provided on the dashboard of a motor vehicle. Speedometer 28 has the usual speed scale and a tachometer needle 30 and also includes display lamp 26 for the ACC function as mentioned above.

The display device also includes a plurality of LEDs 32 which are distributed uniformly with a resolution of 2 km/h over the speed scale in the speed range above 40 km/h. One of these LEDs 32 lighting up indicates the desired speed which has been set with the help of one of switches 16, 18. In the example shown here, the desired speed has been set at 58 km/h and LED 32a assigned to this speed lights up accordingly.

Figure 3:
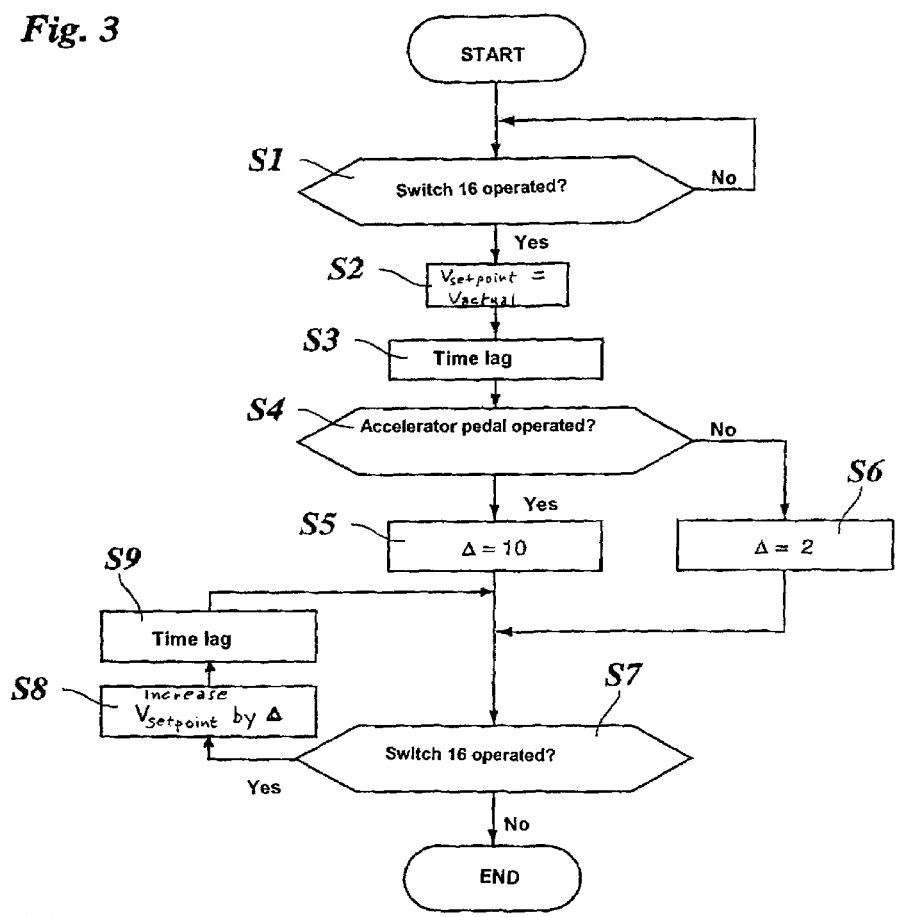
FIG. 3 shows a flow chart to illustrate the functioning of a determination device for the desired speed.

The function of determination device 20, inasmuch as it relates to increasing the desired speed, will now be explained on the basis of the flow chart shown in FIG. 3. The flow chart shows a program routine which is called up at certain intervals, e.g., every 10 ms. After the start of the program, there is a query in step S1 to determine whether switch 16 has been operated. This step is repeated until operation of the switch has been ascertained. In step S2, current speed $V_{actual}$ is then set as new desired speed $V_{setpoint}$.

After a brief waiting period (step S3), there is a query in step S4 by checking accelerator pedal sensor 22 to determine whether the accelerator pedal has been operated. If this is the case, it is assumed that the driver wishes to increase the desired speed as rapidly as possible. Therefore in step S5, an increment Δ for the increase in the desired speed is set at 10 km/h. Otherwise increment Δ is set at a smaller value, e.g., at 2 km/h, in step S6. There is again a query in step S7 to determine whether switch 16 is still being operated, i.e., whether or not the driver has been holding switch 16. In this case, the desired speed is increased again by 10 km/h or by 2 km/h in step S8, and after a certain interval has elapsed (step S9), the routine jumps back to step S7. As long as the driver continues to hold down switch 16, steps S7 through S9 are run through cyclically and the desired speed is increased gradually in increments Δ. While the desired speed is being increased incrementally, cruise control 12 remains active so that the actual speed follows the desired speed with the regulating time lag determined by the system.

When the driver releases switch 16, the program is terminated and the desired speed reached then is saved.

The driver may thus set the current speed as the new desired speed by touching switch 16 only briefly—regardless of whether the accelerator pedal is being operated. In addition, the driver may make a precision adjustment of the desired speed with a resolution of 2 km/h by continuing to operate switch 16 without operating the accelerator pedal. When the driver first depresses the accelerator pedal and then operates switch 16 and holds it, it is assumed that the driver would like to accelerate and substantially increase the desired speed. This is facilitated by having the increase occur with a larger increment Δ=10 km/h and consequently at a greater rate of increase with the same time lag in step S9. In the example shown here, the position of the accelerator pedal is not queried repeatedly, so the high rate of increase is maintained as long as the driver continues to operate switch 16 even if the driver has lifted his foot from the accelerator pedal in the meantime.

The increase in the desired speed is displayed by LEDs 32 of the display device. The driver may thus track the increase in desired speed and may select the desired speed by releasing switch 16 at a suitable moment. Thus the driver's attention is demanded only for a brief period of time because of the high rate of increase.

In the example shown here, the increase in the desired speed is also accomplished with a large increment of 10 km/h, always starting from the instantaneous desired speed. If the desired speed is first 58 km/h, it is then increased incrementally to 68 km/h, 78 km/h, etc. However, the program may optionally modify this, so that in the first execution of step S8 following step S5, the desired speed is increased only to the next higher rounded-off value, i.e., for example, 58 km/h is first increased to 60 km/h and then to 70 km/h, 80 km/h, etc.

Instead of increasing the size of increment Δ, as done in step S5, the rate of increase in the desired speed may also be increased by reducing the time lag in effect in step S9 with no change in the increment.

Figure 4:
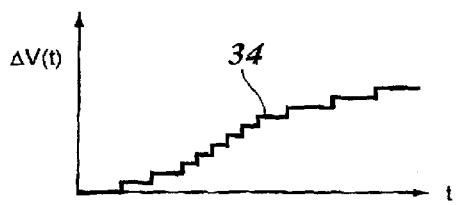
FIGS. 4 and 5 show examples of functions for changing the desired speed.
Figure 5:
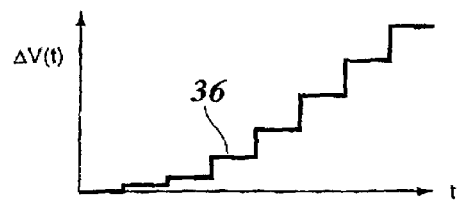

Although in the two examples described above, the desired speed is increased incrementally but linearly on the whole, the desired speed may also be increased according to a nonlinear function over time. Examples are shown in FIGS. 4 and 5. Curves 34 and 36 in FIGS. 4 and 5 represent functions ΔV(t) which indicate the increase in desired speed as a function of time t, during which switch 16 is held in the operated position. In FIG. 4 the desired speed increases first slowly and then progressively more rapidly. With a much longer holding time, the curve flattens out again and then corresponds to a linear increase in the desired speed at a constant rate of increase. The change in the desired speed is always accomplished in the same increments in FIG. 4 but with a different time lag. In FIG. 5, however, the desired speed is increased in constant intervals but by variable increments. The desired speed here increases only slowly at first, but then increases more rapidly and finally at a constant, relatively high, rate of increase.

If accelerator pedal sensor 22 is designed in such a way that it may also quantitatively measure the extent of operation of the accelerator pedal, then the rate of increase in the desired speed may also be varied as a function of the intensity of operation of the accelerator pedal.

What is claimed is:

1. An input device for a cruise control system in a motor vehicle, comprising:
   an acceleration control device, wherein the acceleration control device is an accelerator pedal;
   a switch for inputting a desired speed; and
   a determination device for increasing the desired speed based on an operating time of the switch, wherein the determination device changes at least one of functions which determine an increase in the desired speed based on an operation of the acceleration control device, and wherein the determination device increases the desired speed at a higher rate of increase when the accelerator pedal is also operated while the switch is operated.

2. The input device as recited in claim 1, further comprising:
   a display device for displaying the desired speed that is currently valid.

3. The input device as recited in claim 1, wherein the determination device increases the desired speed by an increment after each time interval of increase has elapsed as long as the switch is operated.

4. The input device as recited in claim 3, wherein the functions which determine the increase in the desired speed differ in an amount of the increment.

5. The input device as recited in claim 3, wherein the functions which determine the increase in the desired speed differ in a length of a time interval of increase.

* * * * *